United States Patent [19]

Wagner

[11] Patent Number: 5,641,104

[45] Date of Patent: Jun. 24, 1997

[54] AMBULANT SALES FACILITY

[76] Inventor: Peer Wagner, Zollschuppenstrasse 7, D-04229 Leipzig, Germany

[21] Appl. No.: 535,016

[22] PCT Filed: Mar. 18, 1994

[86] PCT No.: PCT/EP94/00857

§ 371 Date: Oct. 5, 1995

§ 102(e) Date: Oct. 5, 1995

[87] PCT Pub. No.: WO94/23630

PCT Pub. Date: Oct. 27, 1994

[30] Foreign Application Priority Data

Apr. 8, 1993 [DE] Germany ............................ 9305318 U

[51] Int. Cl.[6] ........................................................ A45F 5/00
[52] U.S. Cl. ........................ 224/270; 224/148.7; 224/191; 224/258
[58] Field of Search ................................. 224/191, 270, 224/271, 257, 258, 263, 627, 628, 629, 633, 646, 148.7, 148 F; 99/484; 126/30; 62/3.64; D7/330–336

[56] References Cited

U.S. PATENT DOCUMENTS

| D. 276,491 | 11/1984 | Shaper et al. ............................ D7/332 |
| 1,601,624 | 9/1926 | Houghton . |
| 3,243,965 | 4/1966 | Jepson ..................................... 62/3.64 |
| 3,250,433 | 5/1966 | Christine et al. ........................ 62/3.64 |
| 3,310,953 | 3/1967 | Rait ......................................... 62/3.64 |
| 3,612,525 | 10/1971 | Carter ..................................... 224/270 |
| 4,993,229 | 2/1991 | Baus et al. .............................. 62/3.64 |
| 5,060,836 | 10/1991 | Bradford et al. ........................ 224/271 |
| 5,186,375 | 2/1993 | Plonk ...................................... 224/270 |

FOREIGN PATENT DOCUMENTS

| 623579 | 5/1992 | Australia . |
| 54783 | 7/1921 | Sweden ................................... 224/257 |
| 111551 | 8/1944 | Sweden ................................... 224/270 |

Primary Examiner—Renee S. Luebke
Assistant Examiner—Gregory M. Vidovich
Attorney, Agent, or Firm—Price, Heneveld, Cooper, DeWitt & Litton

[57] ABSTRACT

An ambulant sales facility having a carrying surface at one end separated from a load equalization surface at an opposite end by at least one horizontal support. The carrying surface is adapted to receive a food preparation installation including at least one of a grill and a drink dispenser. The weight of the food preparation installation may be offset by an energy supply such as a gas bottle located on the load equalization surface.

9 Claims, 3 Drawing Sheets

5,641,104

AMBULANT SALES FACILITY

BACKGROUND OF THE INVENTION

The invention pertains to an ambulant sales facility for preparing and selling freshly prepared snacks, like Bratwursts and other grilled items, as well as for cold and hot drinks.

Ambulant sales facilities, like the self-contained shops worn on the vendor's stomach (Bauchladen), assist in bringing the offered wares as close to the customers as possible, for instance at fairs, in pedestrian malls, and in other areas frequented by the public. In comparison to so-called stalls, such sales facilities excel through their high mobility, since their location can be changed very quickly upon demand. Familiar and also known as ambulant sales facilities are insulated containers that are carried in front of the stomach; they are filled with hot water and fresh hot dogs and the like are sold from them.

But until now there had been no opportunity to sell certain snacks like grilled items, freshly prepared, in such a manner. This is due to the fact that a relatively large selling surface has to be at hand to make possible the sales of sufficient goods for profitability. But until now, this large size was considered unsuitable for the construction of an ambulant sales facility due to the corresponding weight for the carrier.

The invention has, therefore, the objective of overcoming this disadvantage and creating the prerequisites for producing an ambulant sales facility for the preparation and the sales of freshly prepared snacks, like grilled items, and of cold and hot drinks.

The following is a brief description of the different embodiments of the invention.

BRIEF DESCRIPTION OF THE DRAWING FIGURES

FIG. 1 shows schematically the perspective rear view of one embodiment of a facility according to the invention for the grilling of Bratwursts and the like;

FIG. 3b shows the top view of the roller plate shown in to FIG. 3a.

DETAILED DESCRIPTION OF THE PREFERRED EMBODIMENTS

Figure 1:
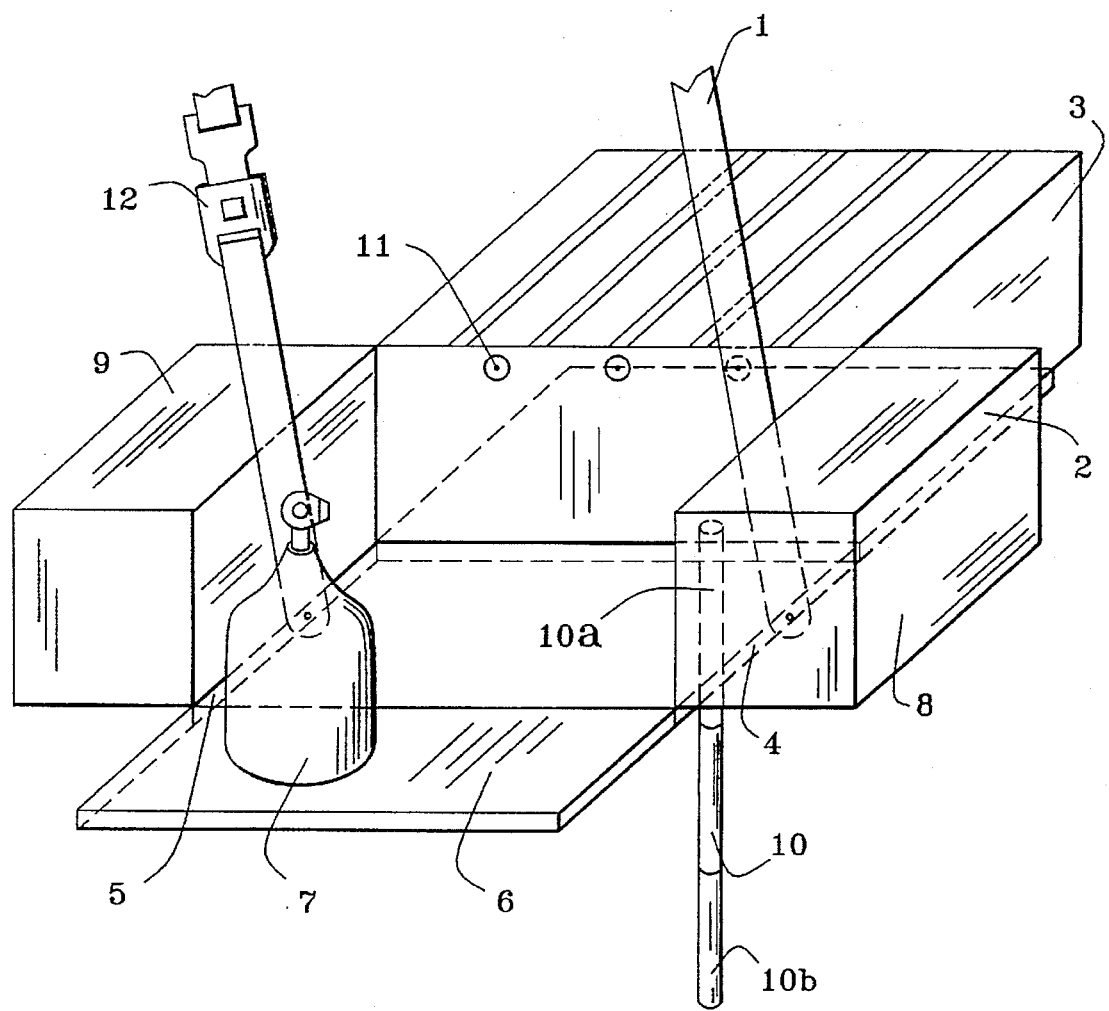

In one embodiment, the invention includes a carrying surface 2, which is held at stomach height by one or more neck and/or shoulder straps 1. An easily accessible grill 3 is mounted on the surface in front of the vendor. Side bars 4 and 5 are mounted on the right and the left side of the carrying surface and lead horizontally past the vendor to the rear. Between these side bars behind the vendor is a horizontal load equalizing plate 6, which, for gas operations, serves as base for the installation and attachment of the propane gas bottle 7. Furthermore, there are supply containers 8 and 9 mounted on each side, left and right of the vendor, for ungrilled goods as well as for condiments, spicy sauces, mustard, paper plates, napkins, etc. The fastening points of the strap(s) 1 on the grill assembly are selected in such a manner, that the grill and the supply containers 8 and 9 have a favorable location for handling by the vendor. The load equalization plate 6 behind the vendor has a defined distance, so that the whole device, when the vendor carries it around the neck and/or the shoulder, are in balance.

An additional support 10 serves as load abatement; it is fastened at end 10a to the underside of the carrying surface 2 and extends down vertically. It can be suitably extended like a telescope and then fastened, so that it can be adjusted to the various body sizes of the vendors. The lower end 10b of the support 10 can be inserted into the side of the vendor's shoe. The shoe can be properly adapted for that purpose, that is, it can be modified to have a receptacle to hold the lower end of the support. The assembly of the parts proceeds with suitably easy connecting pieces, like wing nuts or quick gripping clamps etc., requiring no tools.

The straps have snap buckles 12, like those known in automobile construction and used for safety belts, are easy to open and to close as well as adjustable in length.

The grill runs on ecologically friendly propane gas. The connecting line from the gas bottle to the burners in the grill and the burners themselves are not illustrated to keep the drawing uncluttered and clear. The vendor can regulate the heat supply to the grill with the regulator 11.

Figure 2:
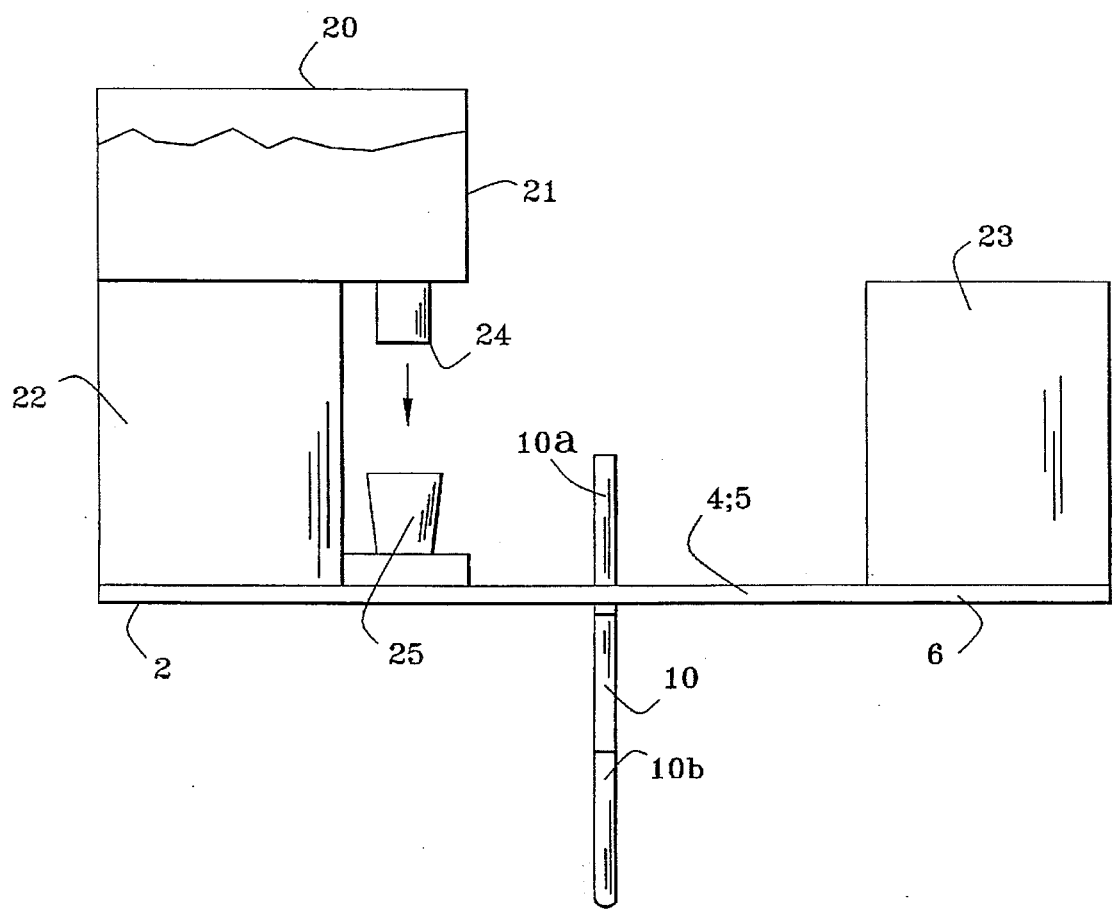
FIG. 2 represents the schematic side view of an alternate embodiment of the facility adapted to carry a drink dispenser.

An alternate embodiment of the facility depicted in FIG. 2 is generally identical to that shown in FIG. 1 in all essential elements. The carrying surface 2 is also held up near the stomach by one or several neck and/or shoulder straps that are not pictured because of the desire to keep the illustrations simple. The side bars 4 and 5 are also joined in their frontal area with the carrying surface 2 and lead on each side horizontally past the vendor to the rear. Behind the vendor, the horizontal load equalizing plate 6 is mounted between the rear areas of the side bars 4 and 5. A drink dispenser 20 with a cold drink supply 21 and a supply line that circulates continuously through a refrigeration circuit 22, not closer represented, is arranged in front of the vendor on the carrying surface 2. The energy supply 23 necessary for the refrigeration circuit, e.g., in the from of a condenser, a generator, or in the form of propane gas, is located on the equalization plate 6. By pressing the dispenser lever 24, the drink flows into the cup 25 and is ready for sale. In this sales facility there are also supply receptacles (not shown) to the left and right of the vendor for holding cups, straws, etc.

In the same way, the ambulant facility can also be modified for the fresh preparation and sale of hot drinks.

The preferred materials for the device should be corrosion resistant and hygienically unobjectionable, but at the same time light in weight. This would mean stainless steel, aluminum, or titanium for supporting parts or for parts subjected to heat, and aluminum or plastic for all the others.

Figure 3A:
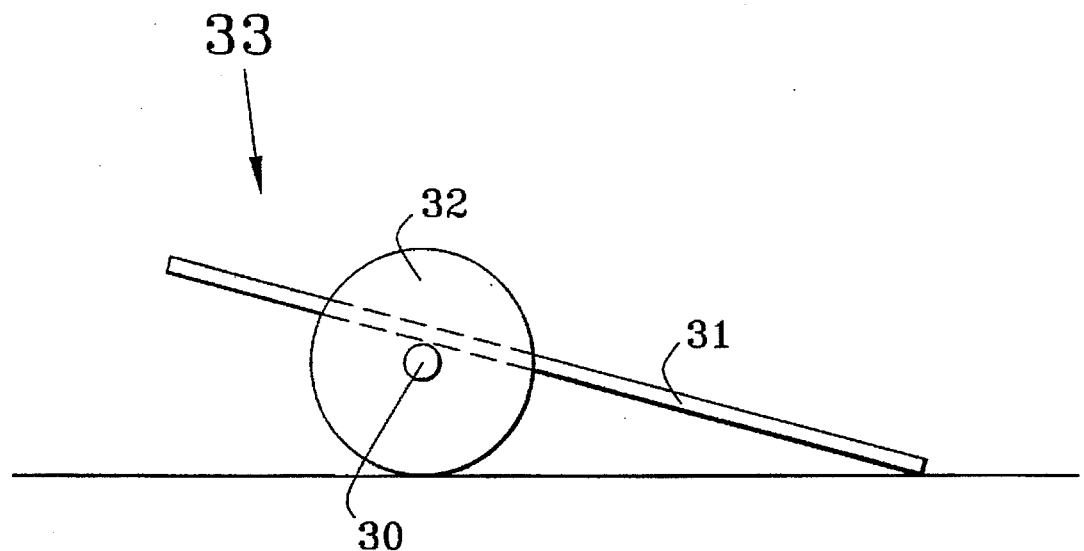
FIG. 3a shows the side view of one embodiment of a roller plate to increase the mobility of the sales facility.
Figure 3B:
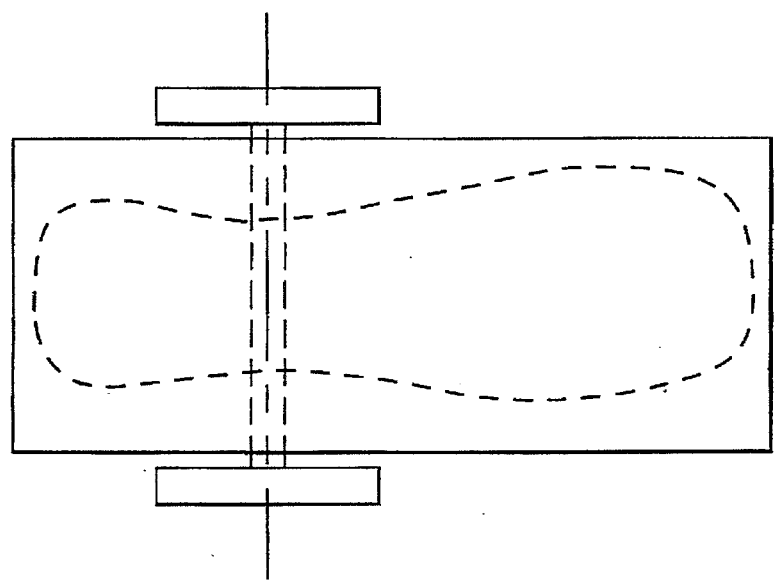

In order to further increase the mobility of the sales facility, a roller plate 33, as illustrated in the FIGS. 3a and 3b, can be provided under the vendor's shoe, where the support 10 is inserted. The plate 31 has essentially a rectangular shape. The axis 30, which is joined to the plate 31, is situated crosswise to the longitudinal direction of the plate at about one third the total distance measured from the rear cross rim.

The described ambulant sales facility is easily transportable to its place of operation, it is quickly operational and ready for business because of its easy assembly, it has a surprisingly large operational capacity to get fresh goods quickly to the customers, and so it can satisfy a large demand at fairs and the like.

I claim:

1. An ambulant sales facility, comprising a carrying surface having a food preparation installation at one end, which is linked to a load equalizing plate at an opposite end of the carrying surface by a pair of spaced apart horizontal side bars; a plurality of supply containers respectively supported by said pair of horizontal side bars at about the level of the side bars; a support strap attached at opposite ends to a respective one of said horizontal side bars; said load equalizing plate having a certain distance from the carrying surface so that it is in equilibrium when said facility is supported at least partially by said strap; and a support member operatively connected to said carrying surface and extending down vertically for additional load abatement.

2. An ambulant sales facility as defined by claim 1 wherein said support member is attached to an underside of said carrying surface.

3. An ambulant sales facility as defined by claim 2, wherein said support member can be telescopically extended.

4. An ambulant sales facility as defined by claim 1, wherein said food preparation installation includes a grill mounted on said carrying surface and said load equalizing plate is adapted to retain a fuel tank for providing fuel to said grill.

5. An ambulant sales facility as defined by claim 1, wherein said food preparation installation includes a drink dispenser mounted on said carrying surface, said load equalizing plate adapted to retain a source for operating said drink dispenser.

6. An ambulant sales facility as defined by claim 5, wherein said drink dispenser includes a hot drink preparation device.

7. An ambulant sales facility as defined by claim 1, wherein said supply containers are on the outside of said horizontal side bars.

8. An ambulant sales facility as defined by claim 4, wherein said support strap is adjustable.

9. An ambulant sales facility as defined by claim 4, wherein the ambulant sales facility is constructed from stainless steel, aluminum, or titanium for parts subjected to heat, and aluminum or plastic for all the others.

* * * * *